May 4, 1965 C. R. WEIDMAN 3,182,299

ELECTRON BEAM SCANNING SEMICONDUCTOR MAGNETIC TAPE READOUT DEVICE

Filed March 21, 1962

INVENTOR
Charles R. Weidman
BY Diggins & LeBlanc
ATTORNEYS

1

3,182,299
ELECTRON BEAM SCANNING SEMICONDUCTOR MAGNETIC TAPE READOUT DEVICE
Charles R. Weidman, 145 6th Ave., Stratford, Conn.
Filed Mar. 21, 1962, Ser. No. 181,405
4 Claims. (Cl. 340—174.1)

This invention relates to a signal transducer apparatus which is capable of reproducing information recorded on a magnetic tape and more particularly relates to an electron beam scanning semiconductor magnetic tape readout device of the resistance type.

One of the earliest and perhaps still the most common device for reproducing magnetic signals contained in a magnetic record medium operates upon the principle of a change in inductance caused by the movement of the record medium past or through a gap in a small toroidal ferromagnetic core which has a pickup coil wound thereon. This movement of the record medium in proximity to the gap in the core causes the inductance of the core to vary thus effecting the signal produced by the pickup coil wound thereon. Since a gapped coil of this type has a frequency response which is approximately proportional to the length of the gap and the velocity at which the recording medium transverses this gap, a pickup of this type is greatly limited both in frequency response and in the speed at which the record medium can be moved.

There are many situations in modern communications and associated fields which require that the recording and playback units not only operate at extremely high speeds but that they also handle a wide frequency band such as is encountered in television signal reproduction for example. Such requirements completely rule out the possibility of using an air gap coil type pickup since there is no known way of either increasing the frequency response of the pickup or the speed at which the record medium can be moved above a given level which is substantially below that required. Thus, there exists a need for a simple and yet reliable apparatus which can operate at high speeds and which has the desired wide band frequency range.

At least one other worker in the recording and playback field has proposed a partial solution to the problem of speed and frequency response which does not involve the use of a gapped core. This proposed solution, however, does not eliminate the basic difficulty of prior playback devices, namely the use of an inductance principle of operation, since the unit utilizes a semiconductor magnetic material coated upon a magnetic reproduction element. Connected to one end of the coated semiconductor magnetic material is a high potential source which interacts with other associated magnetic elements of the pickup arrangement to produce a potential across the semiconductor. This magnetic semiconductor arrangement is then swept by an electron beam so that any change in the semiconductor's magnetic properties produced by the beam and the magnetized record medium caused a change in the magnetic properties of the reproduction element which is, accordingly, reproduced in the pickup coil wound thereon.

Although the use of the magnetic properties of a semiconductor layer for reproducing the information contained in a magnetized record medium completely eliminated the use of the "gapped core" heretofore thought necessary and thus represents a step forward in both speed of operation and fidelity in pickup devices, such a pickup arrangement still leaves much to be desired. For example, the semiconductor pickup still continues to operate upon the "magnetic variation principle" in that its operation depends upon the change in the magnetic properties of the semiconductor and magnetic reproduction element and the

2 ability of the pickup coil wound around the element to detect and reproduce the magnetic changes. As is well known, there exists in all known magnetic responsive materials an inherent inability to instantly and accurately follow any and all slight variations that are recorded upon a magnetized record medium. This is particularly true where the record medium is moving at high speeds and the magnetized record carried thereon covers a wide frequency range. Thus, the inherent limitations present in the magnetic properties of the semiconductor, reproduction element, and output winding which is absolutely necessary in such units still leaves the overall output fidelity and operating speed of the pickup far below that desired and often necessary for modern playback systems.

Yet another disadvantage of the proposed magnetic semiconductor pickup is the use of a high potential which is applied across the semiconductor material. Not only does the use of this potential require an additional external bias source thus increasing the initial cost and possibility of a failure during operation, but also requires that an additional connection be made to the semiconductor material itself. As is well known, such connections are difficult to make and require special trained personnel and equipment which substantially increases the final cost of the magnet semiconductor readout element.

According to the present invention it has been found that these difficulties may be substantially or completely overcome by utilizing a reproduction apparatus having a resistance type semiconductor readout element. This resistance type semiconductor readout element, which gives extremely fast and accurate reproduction of the information contained on a magnetized record medium, consists of a thin electrical conductive layer upon which a filamentary semiconductor is placed. Directly connected to the conductive layer is a readout circuit consisting of a source of potential and a suitable impedance device such as a resistor across which the output signal is produced. A cathode ray tube is provided for housing the readout element and for providing a beam of electrons for scanning successive portions of the element. A lengthy magnetizable record medium having an electrical signal recorded thereon passes by the readout element in such a manner as to affect or alter the resistance of the element in accordance with the magnetic record on the magnetizable medium thus producing an output signal across the impedance device.

Accordingly, it is a primary object of this invention to provide a superior readout apparatus.

Another object of this invention is to provide a readout apparatus of the resistance type.

Yet another object of this invention is to provide a readout apparatus of the electron beam scanning semiconductor magnetic tape type.

Yet still another object of the present invention is to provide novel means for translating a magnetic signal into an electrical signal.

A further object of the present invention is to provide a novel readout element for magnetic tapes.

Yet a further object of the present invention is to provide a novel readout element in which the resistance of the element is changed by a magnetic field.

Yet a still further object of the present invention is to provide a readout device in which the output signals take the form of a sequence of electric pulses which occur in rapid succession and in a pattern which stands in a pre-assigned relation to the input of a magnetized record medium.

Another object of the present invention is to provide a readout apparatus having a wider frequency response than heretofore available.

Yet another object of the present invention is to provide an electronic beam scanning semiconductor resistance readout device that will operate at a higher rate of speed and will give better reproduction of magnetic signals recorded on a magnetizable tape than heretofore known like devices.

These and further objects and advantages of the invention will become more apparent upon reference to the following description and claims and appended drawings wherein:

Figure 1:
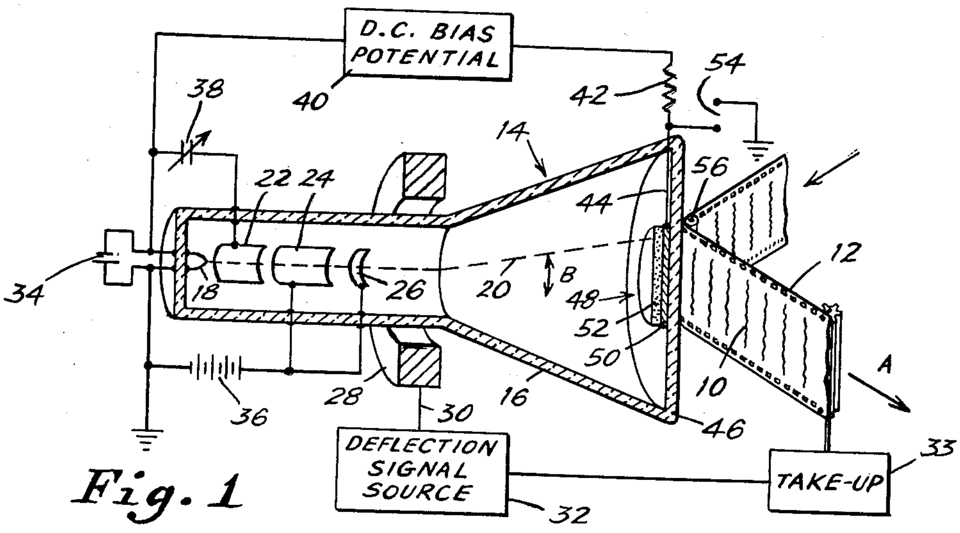
FIGURE 1 is a schematic perspective diagram of apparatus for converting an input signal in the form of a magnetic signal from a magnetizable tape into an electrical output signal.

Referring now to the drawings, FIGURE 1 illustrates apparatus of one form for converting electrical signals in the form of a magnetic condition or pattern 10 recorded on a magnetizable tape 12 into a corresponding electrical output signal. The apparatus includes a cathode-beam tube, indicated generally at 14, comprising an evacuated envelope 16 having therein a cathode 18 for generating a cathode beam 20, a control electrode 22, accelerating electrode 24 and a focusing electrode 26. These various electrodes function in a well known manner to control and form the cathode beam 20 into a preselected shape. Operating bias sources 34 and 36 for the several electrodes, all of which may be of the conventional type, are connected to these electrodes by suitable electrical conducting elements. A variable bias source 38 is connected to the control electrode 22 of the cathode-beam tube for controlling the intensity of the cathode beam 20 while a bias source 40 which may also be variable, is shown connected to a load impedance or resistor 42. A deflection coil 28 is connected through a suitable electrical conductor 30 to a deflection-signal source 32 for deflecting the cathode beam 20 in respect to the face of the tube in a well-known manner.

The enlarged face or end 46 of the cathode ray tube, located opposite to the cathode 18, is provided on its inner surface with a resistor type semiconductor magnetic tape readout or pickup element, shown generally at 48, comprising a metal backing 50 and a semiconductor layer or filament 52 located thereon. The thin metallic, electrical conductive film or backing 50, which is positioned so that it is perpendicular or nearly perpendicular to the direction of the travel of the tape 12, is formed on the inner surface of the tube end 46 in any suitable manner such as, for example, by printing, spraying or plating. The magneto-resistive semiconductive layer or filament 52 is also plated or otherwise formed upon the metal film 50 in a filamentary shape of as small a diameter as practicable which is usually .001 inch or less and is, preferably, from one to several centimeters long. The overall length of the readout element 48 is equal to or somewhat in excess of the excursion of the cathode beam 20 in the course of its sweep down the element and is preferably of substantially the same width as the beam. A suitable potential is applied to the metallic film 50 through the electrical conductor 44 which is connected to the low potential end of the lead resistor 42. The output from the readout element, as it is developed across the load resistor 42, appears at the output terminals 54 and may be applied to any suitable amplifying or utilizing circuit as will be readily apparent.

The magnetizable tape 12 is advanced in synchronism with the deflection signals produced by the circuit 32 by any suitable take-up device such as, for example, a motor driven take-up reel shown generally at 33. The direction in which the tape normally moves as it passes between the readout element 48 and a suitable roller device 56 is indicated by the arrow A.

In operation, the output voltage from the deflection signal source 32 is applied to the deflection coil 28 and causes the cathode beam 20 to sweep up and down along the length of the readout element 48 as indicated by the arrow B. This sweeping of the readout element is at approximately a constant speed until the beam reaches one end of the element such as, for example, the lower end at which time the beam is blanked by a suitable circuit (not shown) and is rapidly deflected back to the upper end of the element. The beam is now ready to begin another sweep down the semiconductor readout element. As stated hereinabove, the various sweeps of the cathode beam is synchronized with the device driving the magnetic tape as it moves past the readout element so that the output signal appearing at the terminal 54 will be synchronized with the movement of the beam and tape.

The localized magnetic fields of the magnetic pattern 10 recorded on the tape 12 penetrates through the relatively thin end 46 of the cathode ray tube and thus cause the magnetic information contained in each pattern of the tape to be immediately transferred to and impressed upon the semiconductor readout element 48 as a change in its axial distributed electrical resistance properties. This change in the distributed electrical resistance properties of the readout element by the magnetic field of the tape is caused by the well known susceptibility of a semiconductor material to changes in its electrical resistance properties when it is subjected to the influence of various magnetic fields, especially where such fields are locally concentrated at specific regions within the semiconductor material. The specific manner in which the semiconductor readout element resistance property is effected by locally concentrated magnetic fields produced by the tape 12 will be more fully understood by reference to FIGURES 2 and 3 in which a more detailed showing of the readout element 48 is given along with a graph showing the output signals produced as the magnetic pattern 10*a* moves by the element.

Figure 2:
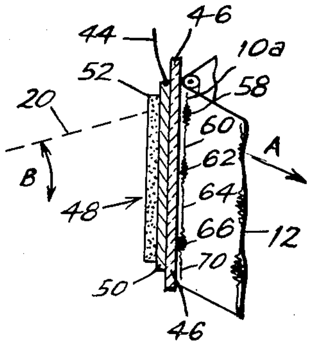
FIGURE 2 is an enlarged view of the semiconductor resistance readout element and its associated elements as shown in FIGURE 1.
Figure 3:
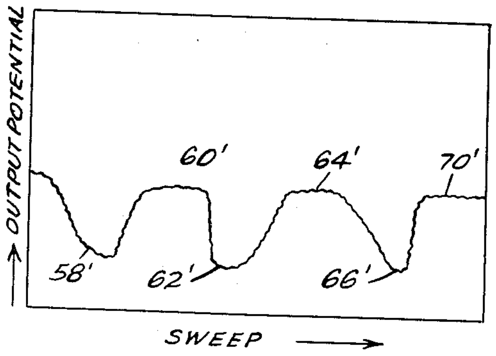
FIGURE 3 is a graph depicting the various electrical output signals produced when a given magentic pattern is passing the resistance readout element of FIGURE 2.

As can be seen in FIGURE 2, the magnetic pattern 10*a* has a plurality of magnetic signals 58–70 impressed thereon which vary in intensity from substantially zero such as represented at 58 to a preselected maximum value as is represented at 60. The signal represents a recorded signal of strong intensity and will therefore be represented on the tape by a high intensity magnetic field extending perpendicular to the tape face 12 and the readout element 48. This high intensity magnetic field will act upon the semiconductor element 52 to increase its impedance or resistance thus not permitting the cathode beam and electrons associated therewith to penetrate or pass through the layer 52 and thus strike or contact the metallic film 50 to a lesser extent than would be the case if the magnetic field were not present. Thus, as the electron beam 20 sweeps along the semiconductor element 52 in the course of each scan, the point of impact of the beam on the element, which is the instantaneous source of electrons, moves along and so passes through or encounters localized magnetic fields which penetrate the element from the perpendicular magnetized tape outside the tube face. These localized fields, as pointed out above, can be of any intensity from zero to a chosen maximum so that the electron flow through the semiconductor element may be varied anywhere between its normal high value to a chosen minimum value which represents a strong recorded signal.

A decrease in the resistance of the semiconductor element will result in an increase in the flow of electrons through the semiconductor element which, in turn, will cause a corresponding increase in the current flow through the lead impedance or resistor 42 thereby causing the output at the terminals 54 to become more negative (less positive) with respect to the bias potential furnished by the supply 40. This effect is shown at 58' in FIGURE 3. As the beam 20 moves along the length of the semiconductor readout element from top to bottom, the next variation in resistance will be produced by the relatively weak magnetic field produced by the signal 60 which represents a recorded version of an original weak recorded signal. Since the magnetic field produced by the signal 60 is very weak, the resistance properties of the semiconductor element 52 will be affected very little and will be substantially the same as if no magnetic field were present. This results in the cathode beam 20 not being greatly restricted in its flow through the semiconductor element 52 (since the semiconductor element may normally be considered a low impedance resistor) thus causing the potential at terminal 54 to decrease to substantially below that of the bias potential furnished by source 40. The potential appearing at terminals 54 as the beam sweeps over this portion of the semiconductor element 52 which is under the influence of the signal 60 is shown at 60' in FIGURE 3. Similarly, the various potentials produced by the remaining magnetic pattern 62–70 are shown at 62'–70' in FIGURE 3.

The resistance semiconductor readout apparatus thus converts the magnetic signals of patterns 10*a* recorded on the tape into corresponding electrical signals which are serially arranged in time at the output terminals 54. Similarly, on the next sweep of the beam 20, the tape will be advanced by an amount which is sufficient to locate a different parallel spaced pattern 10 opposite the readout element 48. The new magnetic signals contained in the spaced pattern are then detected by the resistance semiconductor readout which causes the output potential at terminals 54 to vary as the cathode beam sweeps along the semiconductor thus producing serial time sequence electrical signals that correspond with the details of the signals recorded on the tape.

Figure 4:
FIGURE 4 is an alternative type of resistance semiconductor readout element.

FIGURE 4 shows a different type of readout element in which the semiconductor material 72 is of a filament type and is partially surrounded by a sheet or layer of electrical conductive material 74. An electrical lead-out 76 is shown connected to the metal sheet 74 for connecting the element to an electrical circuit such as the load resistor 42 of FIGURE 1.

Figure 5:
FIGURE 5 shows yet another type of resistance semiconductor readout element according to this invention.

An alternate arrangement of the readout element is shown in FIGURE 5 in which the metal conductor 78 is completely surrounded by the semiconductor material 80. The terminal lead, which may be an extension of the conductor 78, is shown at 82. Other obvious alternative constructions may be used which provide a continuous conducting path or strip along the axis of the semiconductor while leaving a suitable portion of the entire axial length of the semiconductor exposed so that it can be scanned by an electron beam.

It will be apparent from the foregoing that the device of this invention is relatively simple to construct and yet will give extremely fast and accurate readouts from any magnetized recording medium. The use of a magneto-resistance semi-conductor filament, which is connected directly to a readout circuit by a suitable electrical conductor rather than through a transformer or other type of arrangement, provides increased reproduction accuracy at a lower cost than heretofore known like devices which utilize the magnetic variation principle. There is also substantially no maintenance cost involved in using a readout device such as disclosed since the semiconductor element has practically an indefinite life expectancy as compared to other elements included in the circuit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A magnetic readout device comprising an enclosure, an electron beam producing means within said enclosure comprising a cathode adapted for the emission of electrons, a screen formed on the inner surface of said enclosure, means for focusing and directing said electron beam from said cathode to said screen, said screen comprising a thin metallic backing layer formed on the inner surface of said enclosure and a layer of magnetically susceptible semiconductor material formed on said backing layer, potential means connected between said screen and said cathode, impedance means connected between said potential means and said screen output terminal, means connected to said impedance means for passing a magnetized record medium by said screen whereby a change is produced in the resistance of the semiconductor layer of said screen, said change in resistance resulting in a variation in the flow of electrons through said impedance means producing a corresponding change in signal at said output terminal means, means for transporting said record medium, and means for synchronizing said means for scanning said beam over said screen with said means for transporting said record medium.

2. A magnetic readout device according to claim 1 wherein said electron beam producing means is a cathode ray tube.

3. A magnetic readout device according to claim 1 wherein said magnetized record medium is a tape, said tape passing across the outer face of said cathode ray tube transverse to said screen.

4. A magnetic readout device according to claim 3 wherein said semiconductor layer is the same width as said electron beam.

References Cited by the Examiner

UNITED STATES PATENTS

| | | | |
|---|---|---|---|
| 2,916,639 | 12/59 | Krembs | 340—174.1 X |
| 2,959,771 | 11/60 | Levin | 340—174.1 |
| 3,098,998 | 7/63 | Smith | 179—100.2 |

IRVING L. SRAGOW, *Primary Examiner.*